US012182942B2

(12) United States Patent
Hung et al.

(10) Patent No.: US 12,182,942 B2
(45) Date of Patent: Dec. 31, 2024

(54) METHOD OF PRODUCING ADAPTIVE ELEMENT FOR DENTAL IMPLANTATION

(71) Applicants: Tsung-Fu Hung, New Taipei (TW); Po-Jan Kuo, New Taipei (TW); Hsin-Yu Kuo, New Taipei (TW)

(72) Inventors: Tsung-Fu Hung, New Taipei (TW); Po-Jan Kuo, New Taipei (TW); Hsin-Yu Kuo, New Taipei (TW)

( * ) Notice: Subject to any disclaimer, the term of this patent is extended or adjusted under 35 U.S.C. 154(b) by 1171 days.

(21) Appl. No.: 16/716,105

(22) Filed: Dec. 16, 2019

(65) Prior Publication Data

US 2020/0405459 A1  Dec. 31, 2020

(30) Foreign Application Priority Data

Jun. 25, 2019  (TW) ................................ 108122116

(51) Int. Cl.
| | | |
|---|---|---|
| G06T 19/00 | (2011.01) | |
| A61C 13/00 | (2006.01) | |
| G06T 7/00 | (2017.01) | |
| G06T 19/20 | (2011.01) | |
| G06V 20/64 | (2022.01) | |

(52) U.S. Cl.
CPC .......... G06T 19/00 (2013.01); A61C 13/0004 (2013.01); A61C 13/0019 (2013.01); G06T 7/0012 (2013.01); G06T 19/20 (2013.01); G06V 20/64 (2022.01); *G06T 2200/08* (2013.01); *G06T 2207/10081* (2013.01); *G06T 2207/30036* (2013.01)

(58) Field of Classification Search
CPC .......................... G06V 10/44; A61C 13/0004; A61C 13/0019; G06T 7/0012; G06T 19/20; G06T 2200/08; G06T 2207/10081; G06T 2207/30036
See application file for complete search history.

(56) References Cited

U.S. PATENT DOCUMENTS

2015/0025855 A1*  1/2015  Fisker ................... A61C 1/082
                                                                                                 703/1

FOREIGN PATENT DOCUMENTS

AU        2012367264 A1 *  9/2014  ............... A61B 1/24

OTHER PUBLICATIONS

Exocad ("exocad Video Tutorial (basic): Custom Abutment Design", 2017, https://www.youtube.com/watch?v=9AVi2lhAxZI) (Year: 2017).*

(Continued)

*Primary Examiner* — Xin Sheng
(74) *Attorney, Agent, or Firm* — HSML P.C.

(57) ABSTRACT

A method for producing an adaptive element for dental implantation includes: obtaining images of a tooth and creating a 3D model based thereon; obtaining a boundary curve on the 3D model between crown and root parts thereof; defining a cutting line on the root part perpendicular to an axis of the 3D model and spaced apart from the boundary curve; extracting a sub-model from the 3D model with reference to the boundary curve and the cutting line; forming a tubular model from the sub-model by removing all that corresponds to the crown part and hollowing out the sub-model such that the tubular model has a predetermined thickness in radial directions transverse to the axis; and producing the adaptive element according to the tubular model.

8 Claims, 14 Drawing Sheets

(56) References Cited

OTHER PUBLICATIONS

ExocadBrochure ("The complete software solution for digital dentistry", 2015, http://www.d3digital.biz/images/downloads/brochures/exocad_brochure.PDF) (Year: 2015).*
Organical ("Exocad 3D Printing Files", Jun. 4, 2019, https://www.youtube.com/watch?v=S6Z91TnjNvA) (Year: 2019).*

* cited by examiner

METHOD OF PRODUCING ADAPTIVE ELEMENT FOR DENTAL IMPLANTATION

CROSS-REFERENCE TO RELATED APPLICATION

This application claims priority of Taiwanese Invention Patent Application No. 108122116, filed on Jun. 25, 2019.

FIELD

The disclosure relates to dental implantation, and more particularly to an adaptive element for dental implantation.

BACKGROUND

In conventional dental implantation, a first stage is to bury an implant, which is a metal post serving as a tooth root, in a patient's jaw bone by surgery.

After 3 to 6 months of osseointegration, the implant may become permanently stable, meaning that new bone has grown to the surface of the implant. Then, an abutment is attached to the implant for securing a dental crown (or prosthetic tooth). Lastly, the dental crown is connected to the abutment with lag screws or with dental cement.

In general, conventional abutments are designed to have standardized sizes and shapes. A dentist can only select one that matches the buried implant and most suitably fits the patient's gum. However, the fit may not be perfect so the selected conventional abutment may be too tight or too loose for the gum.

SUMMARY

Therefore, an object of the disclosure is to provide a method for producing an adaptive element for dental implantation that can alleviate at least one of the drawbacks of the prior art.

According to the disclosure, the method includes steps of: obtaining images of a target tooth of a patient; creating a three-dimensional (3D) virtual model based on the images of the target tooth, wherein the 3D virtual model includes a crown part and a root part connected to the crown part; obtaining a boundary curve on the 3D virtual model between the crown part and the root part; defining a cutting line on the root part of the 3D virtual model in a manner that the cutting line is perpendicular to a vertical axis of the 3D virtual model and is spaced apart from the boundary curve; extracting a sub-model from the 3D virtual model with reference to the boundary curve and the cutting line; forming a tubular model from the sub-model by removing all that corresponds to the crown part and by hollowing out the sub-model such that the tubular model has a predetermined thickness in radial directions transverse to the vertical axis; and producing the adaptive element according to the tubular model.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Figure 1:
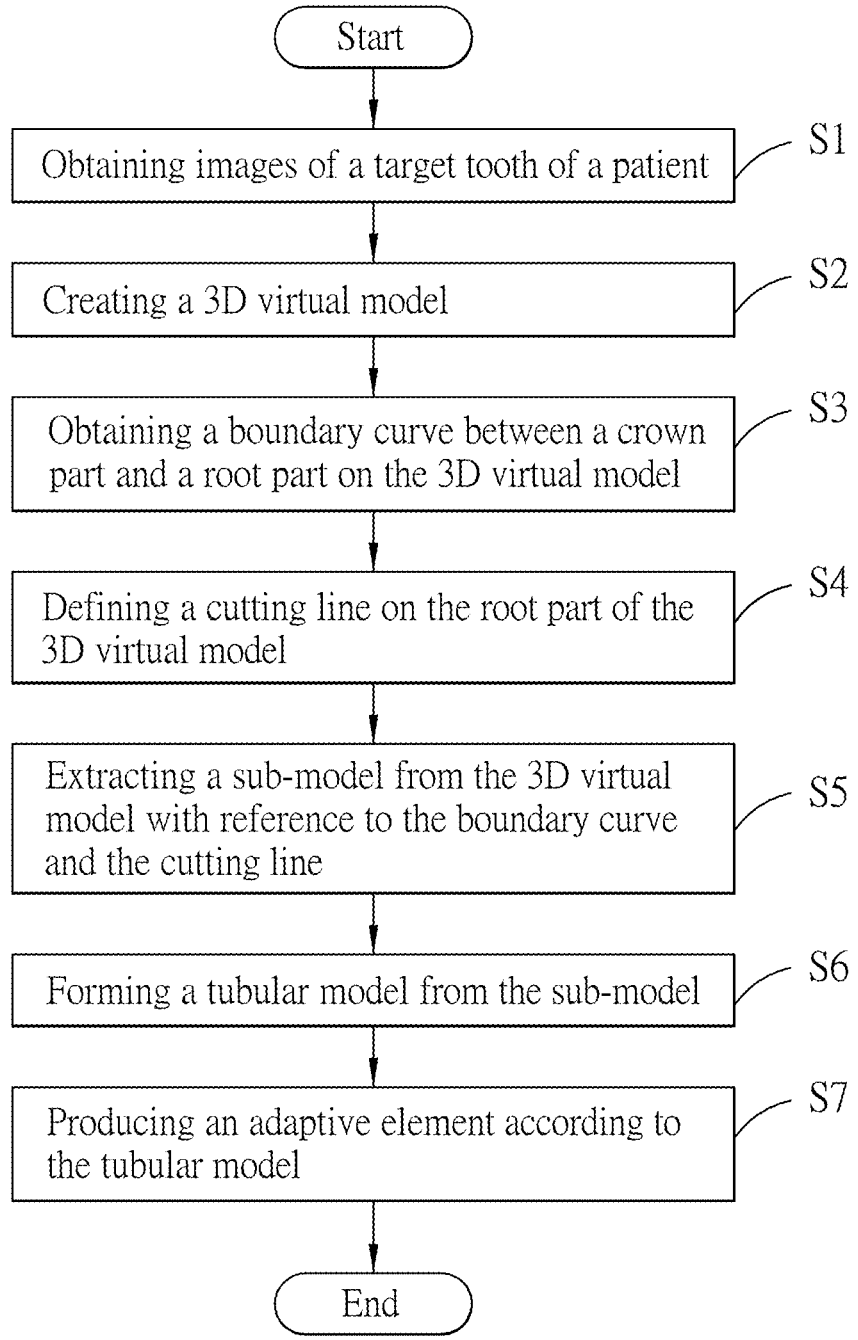
FIG. 1 is a flow chart exemplarily illustrating a method for producing an adaptive element for dental implantation according to an embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 15:
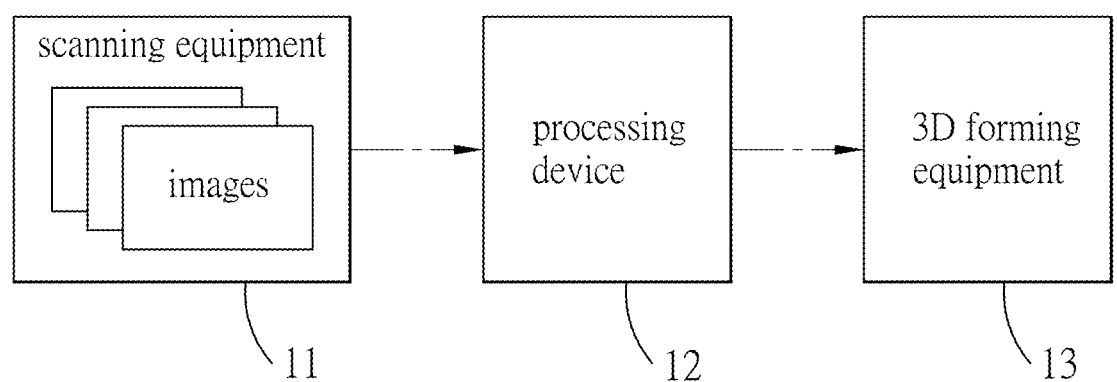
FIG. 15 is a block diagram exemplarily illustrating components of a system according to an embodiment of this disclosure.

Referring to FIG. 1, a method for producing an adaptive element 68 (see FIG. 12) for dental implantation includes the steps as follows. The method is implemented by, for example, a system shown in FIG. 15. The system of FIG. 15 includes a scanning equipment 11, a processing device 12 and a three-dimensional (3D) forming equipment 13.

Figure 2:
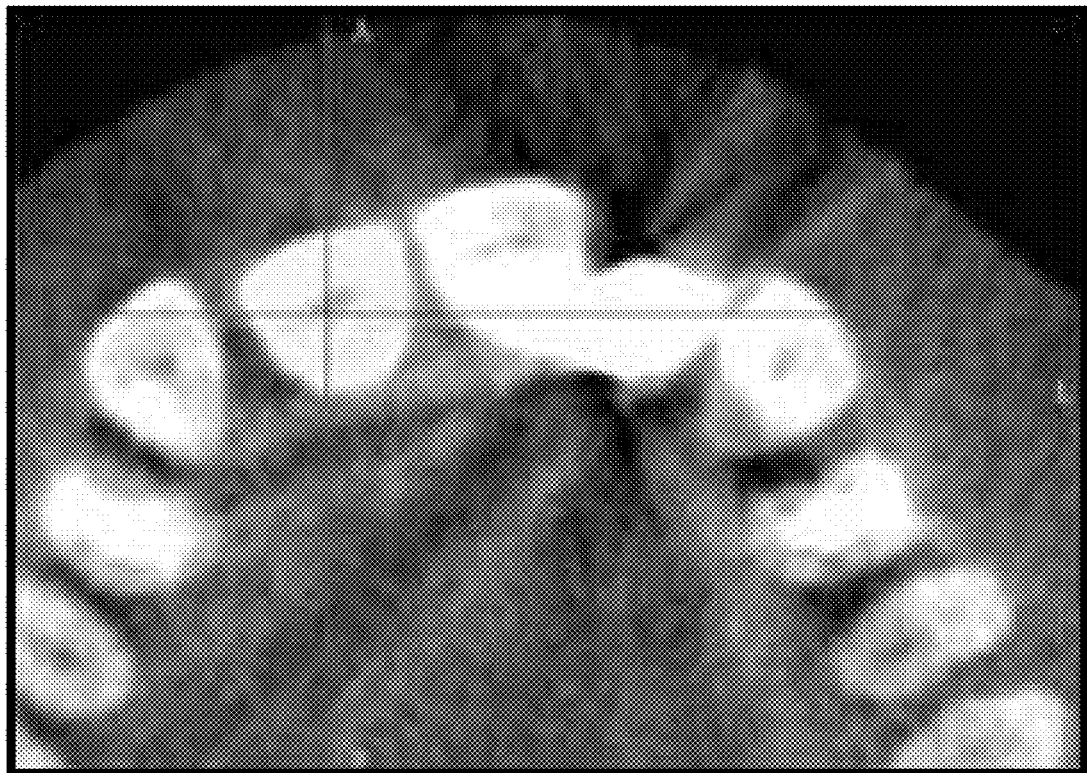
FIG. 2 is an axial view of a target tooth of a patient.
Figure 3:
FIG. 3 is a sagittal view of the target tooth of the patient.
Figure 4:
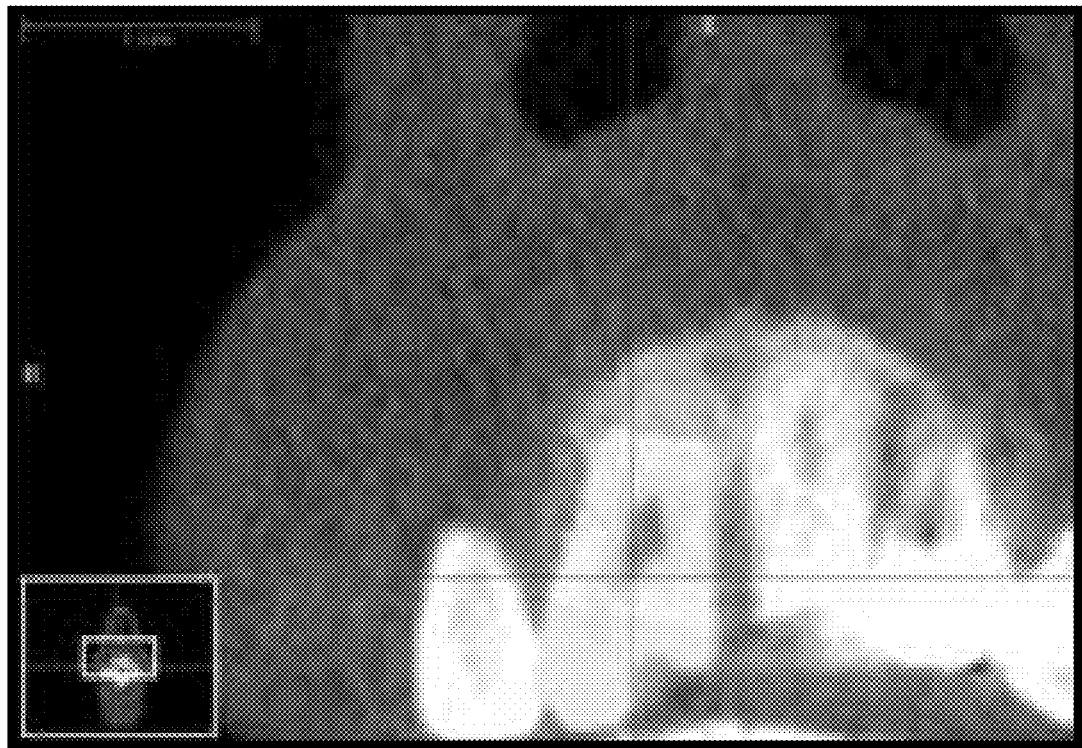
FIG. 4 is a coronal view of the target tooth of the patient.
Figure 5:
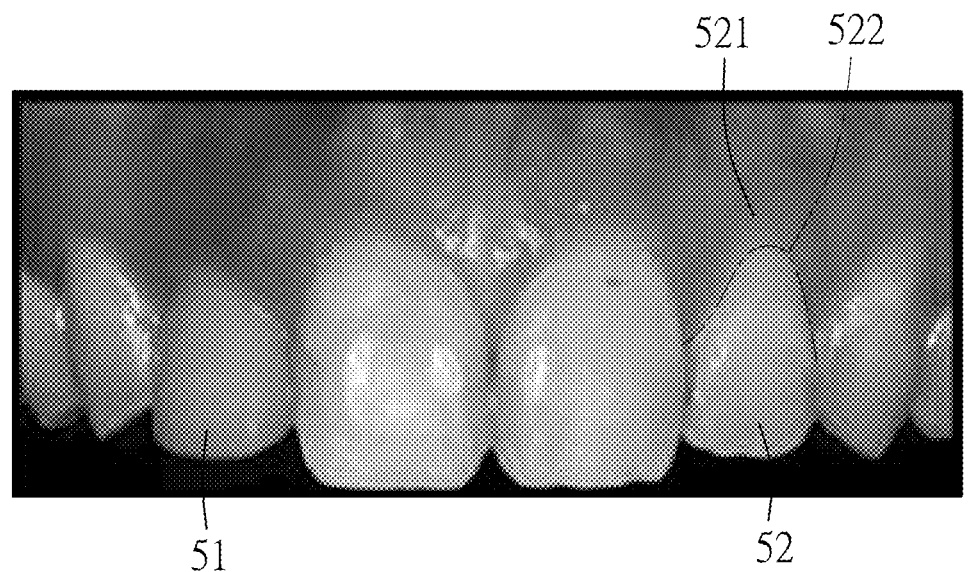
FIG. 5 is a picture showing a to-be-treated tooth on one side and a symmetric tooth on the other side.

In step S1 of the method, the scanning equipment 11 obtains images of a target tooth of a patient. According to the embodiment, the scanning equipment 11 is a cone beam computed tomography (CBCT) system for obtaining 3D images of the target tooth as shown in FIGS. 2 to 4. Further referring to FIG. 5, the target tooth may be a to-be-treated tooth 51, or a symmetric tooth 52 that is located on the other side of the mouth, symmetrically to the to-be-treated tooth 51. Specifically, when the to-be-treated tooth 51 has a complete root, the to-be-treated tooth 51 may be designated as the target tooth even if the crown thereof has decayed or damaged. Alternatively, when the root of the to-be-treated tooth 51 has decayed or damaged or there is a missing tooth, the symmetric tooth 52 of the to-be-treated tooth 51 or the missing tooth may be designated as the target tooth.

Figure 6:
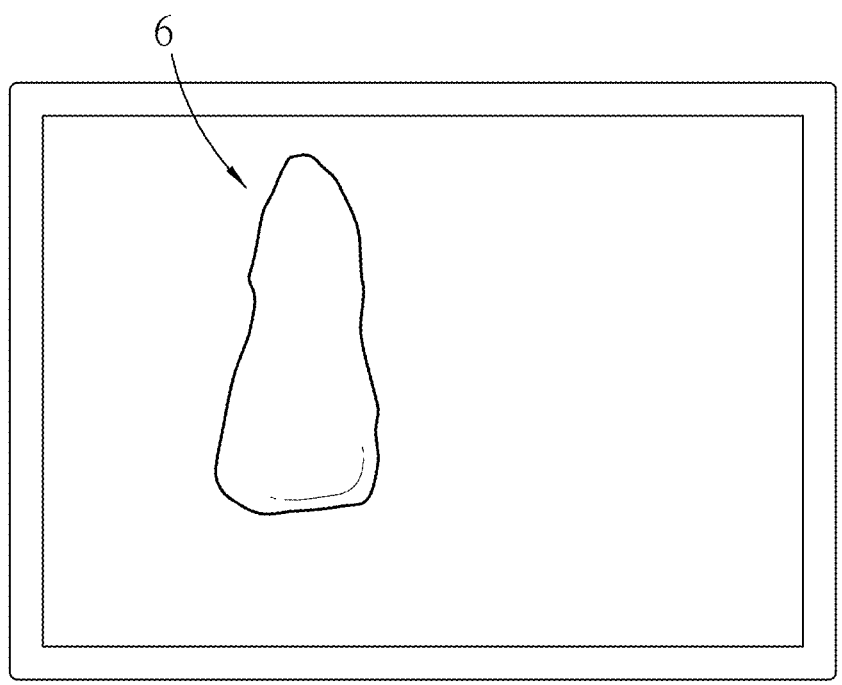
FIG. 6 is a schematic view of a three-dimensional (3D) virtual model created based on the images of FIGS. 2 to 4.
Figure 7:
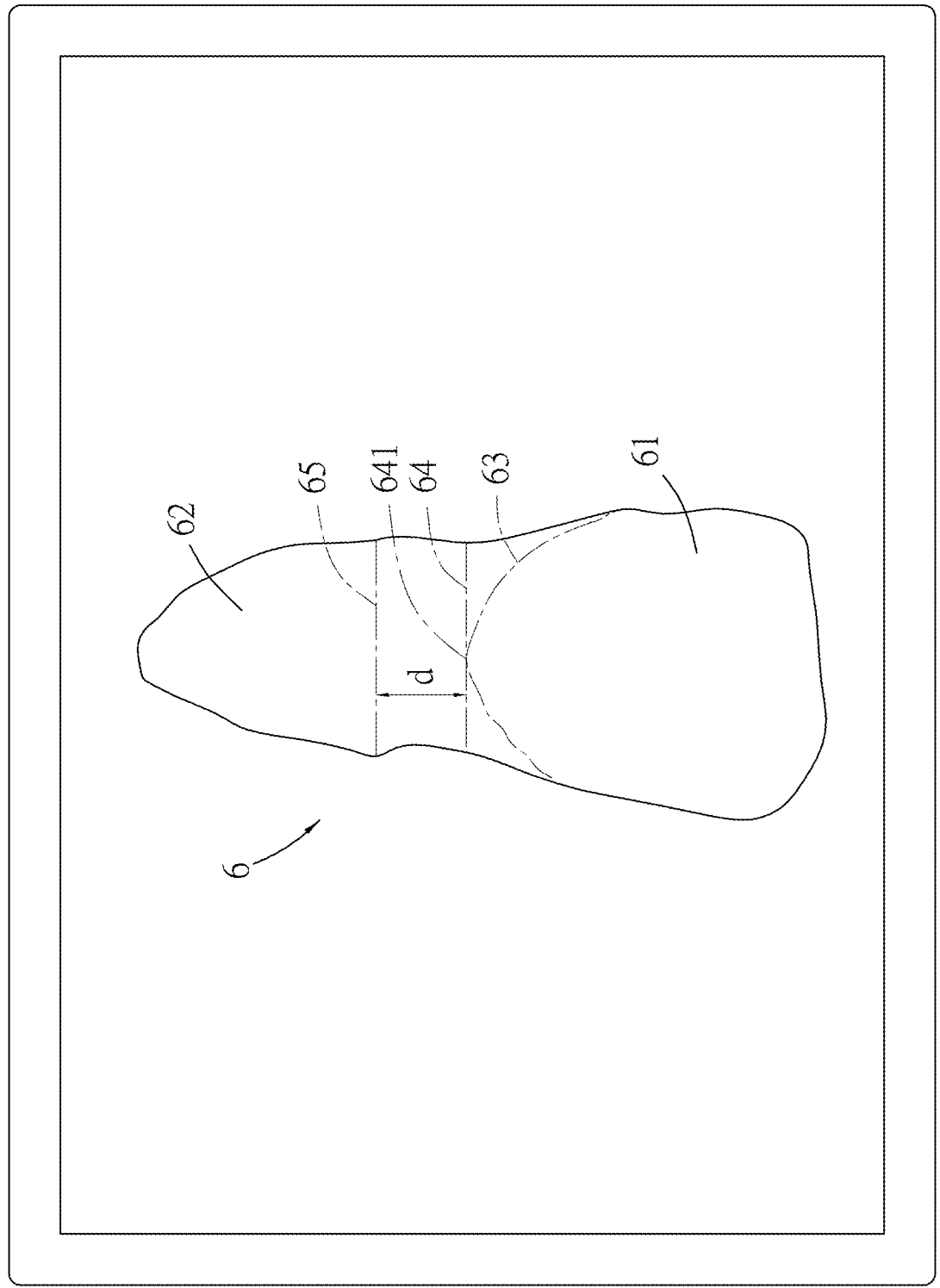
FIG. 7 is a schematic view illustrating a boundary curve, a tangent line and a cutting line on the 3D virtual model.

In step S2, the processing device 12 creates a 3D virtual model 6 (see FIGS. 6 and 7) based on the images obtained in step S1. The 3D virtual model 6 includes a crown part 61 and a root part 62 connected to the crown part 61. Specifically, the crown part 61 and the root part 62 of the 3D virtual model 6 correspond to a crown and a root of the to-be-treated tooth 51 or the missing tooth, respectively.

The processing device 12 is, for example, a computer having a non-transitory memory storing an image processing software (e.g., ITK-snap or OsiriX, etc.), and a processing module (e.g., an integrated circuit chip, a programmable logic device, a Programmable Gate Array (PGA), a field-programmable gate array (FPGA), an Application Specific Integrated Circuit (ASIC), etc.) configured to execute the software.

It should be noted that, in the case that the symmetric tooth 52 is designated as the target tooth, the processing device 12, in step S2, initially creates an initial 3D model that corresponds to and represents the symmetric tooth 52 based on the images of the target tooth, and then creates a mirrored copy of the initial 3D model to serve as the 3D virtual model 6 that corresponds to the to-be-treated tooth 51 or the missing tooth.

In step S3, the processing device 12 obtains a boundary curve 63 between the crown part 61 and the root part 62 on the 3D virtual model 6. The boundary curve 63 corresponds to a boundary 522 (see FIG. 5) between, for example, the symmetric tooth 52 and a gum part 521 of the gums. In one embodiment, the processing device 12 analyzes variation of the curvature of a facial surface of the 3D virtual model 6 to obtain the boundary curve 63 according to the variation of the curvature. It should be noted that the facial surface means the labial side for an anterior tooth (e.g., incisors and canines), and means the buccal side of a posterior tooth (e.g., molars and premolars). In some embodiments, an operator may manually mark a plurality of points between the crown part 61 and the root part 62 on the 3D virtual model 6, and the processing device 12 then connects the marked points to obtain the boundary curve 63 or constructs the boundary curve 63 that has the best fit to the marked points.

In step S4, the processing device 12 defines a cutting line 65 on the root part 62 of the 3D virtual model 6 in a manner that the cutting line 65 is spaced apart from the boundary curve 63 and is perpendicular to a vertical axis of the 3D virtual model 6. The vertical axis is defined in the coronal and apical directions of the tooth represented by the 3D virtual model 6. In one embodiment, the processing device 12 defines, as the cutting line 65, a line that is parallel to and spaced apart by a predetermined distance (d) from a tangent line 64 touching a reference point 641 of the boundary curve 63 and perpendicular to the vertical axis, wherein the reference point 641 is an extremity of the boundary curve 63 on the facial surface of the 3D virtual model 6 along the vertical axis.

Figure 8:
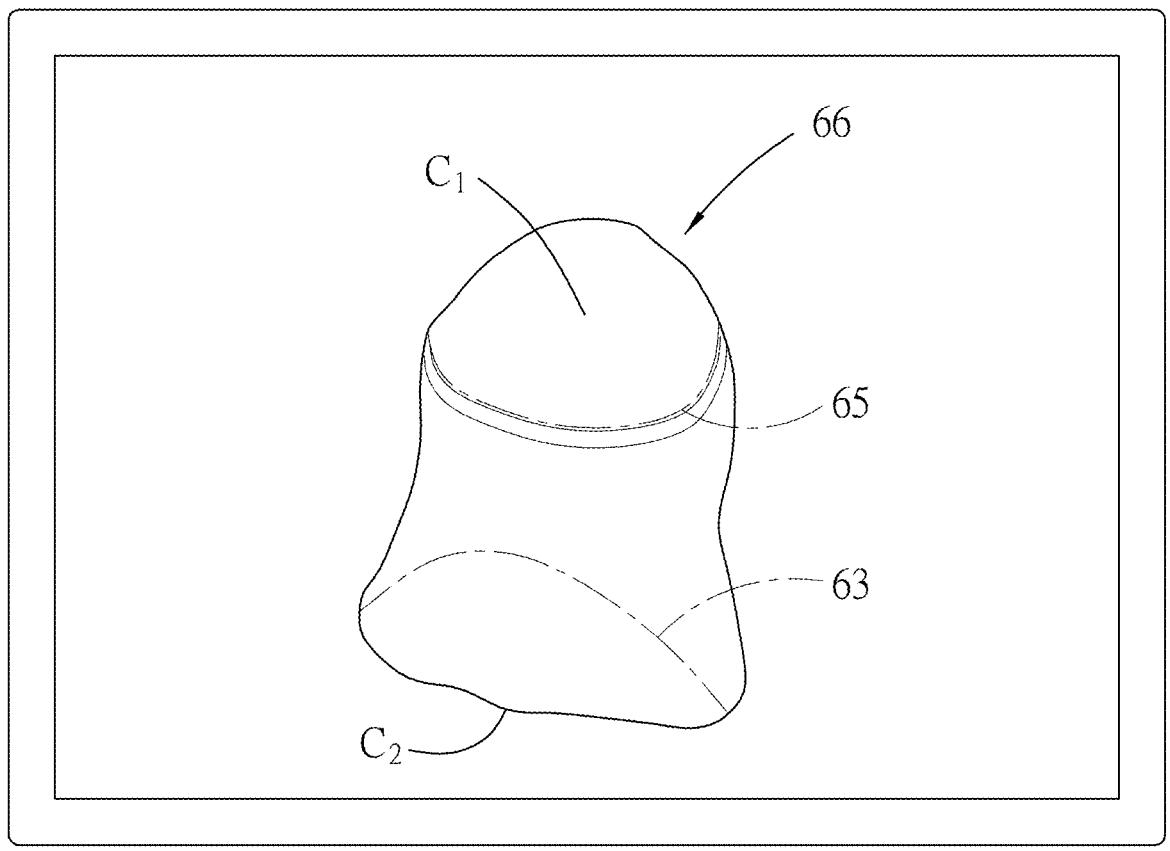
FIG. 8 is a schematic view of a sub-model extracted from the 3D virtual model.

In step S5, the processing device 12 extracts a sub-model 66 (see FIG. 8) from the 3D virtual model 6 with reference to the boundary curve 63 and the cutting line 65. Specifically, further referring to FIG. 8, the processing device 12 extracts a segment of the 3D virtual model 6 between a first cross section $C_1$ aligning with the cutting line 65 and a second cross section $C_2$ spaced apart from the first cross section $C_1$ to serve as the sub-model 66 in a manner that the sub-model 66 contains the entirety of the boundary curve 63.

Figure 9:
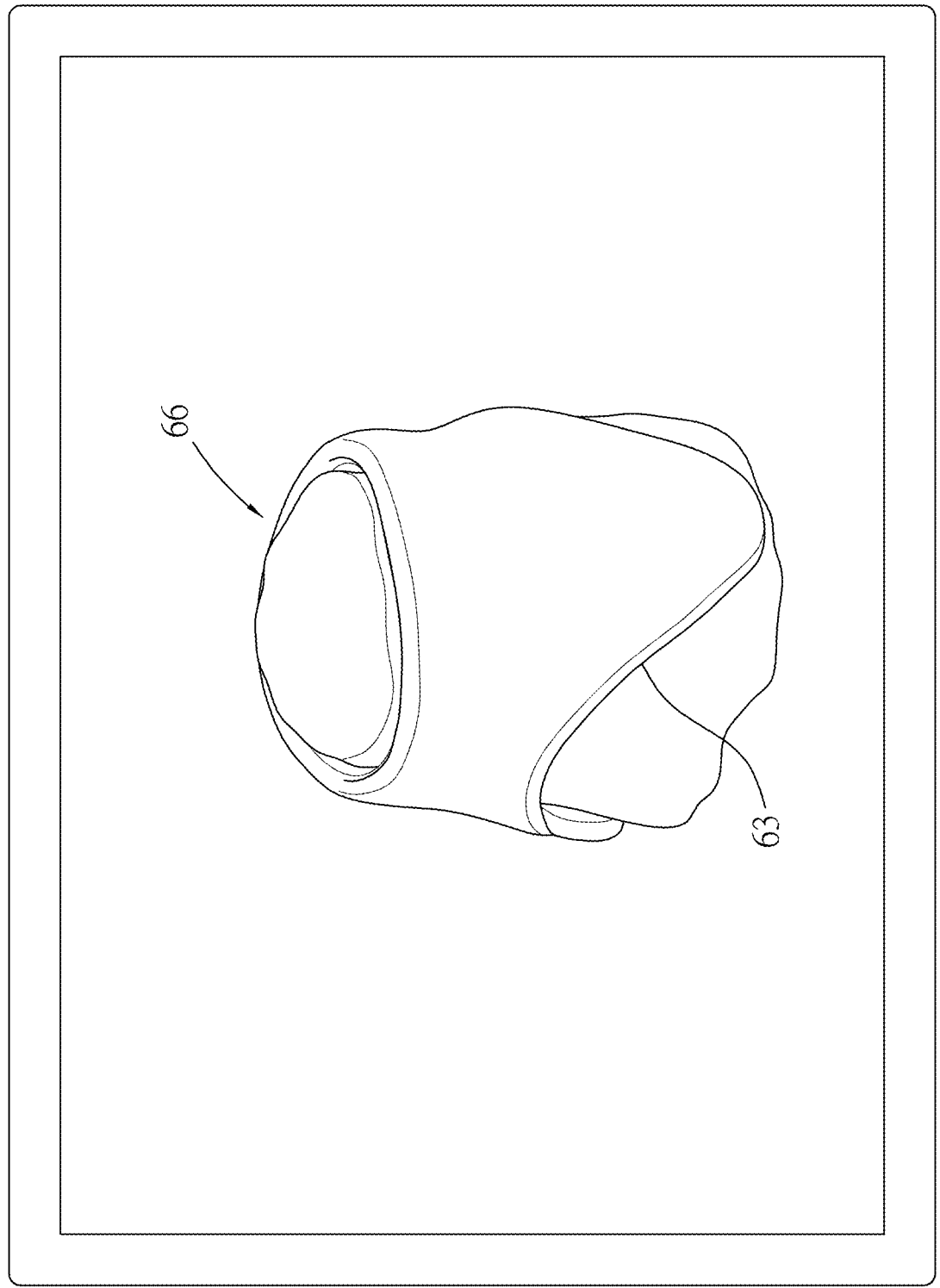
FIG. 9 is a schematic view illustrating an intermediate product in a step of forming a tubular model from the sub-model.
Figure 10:
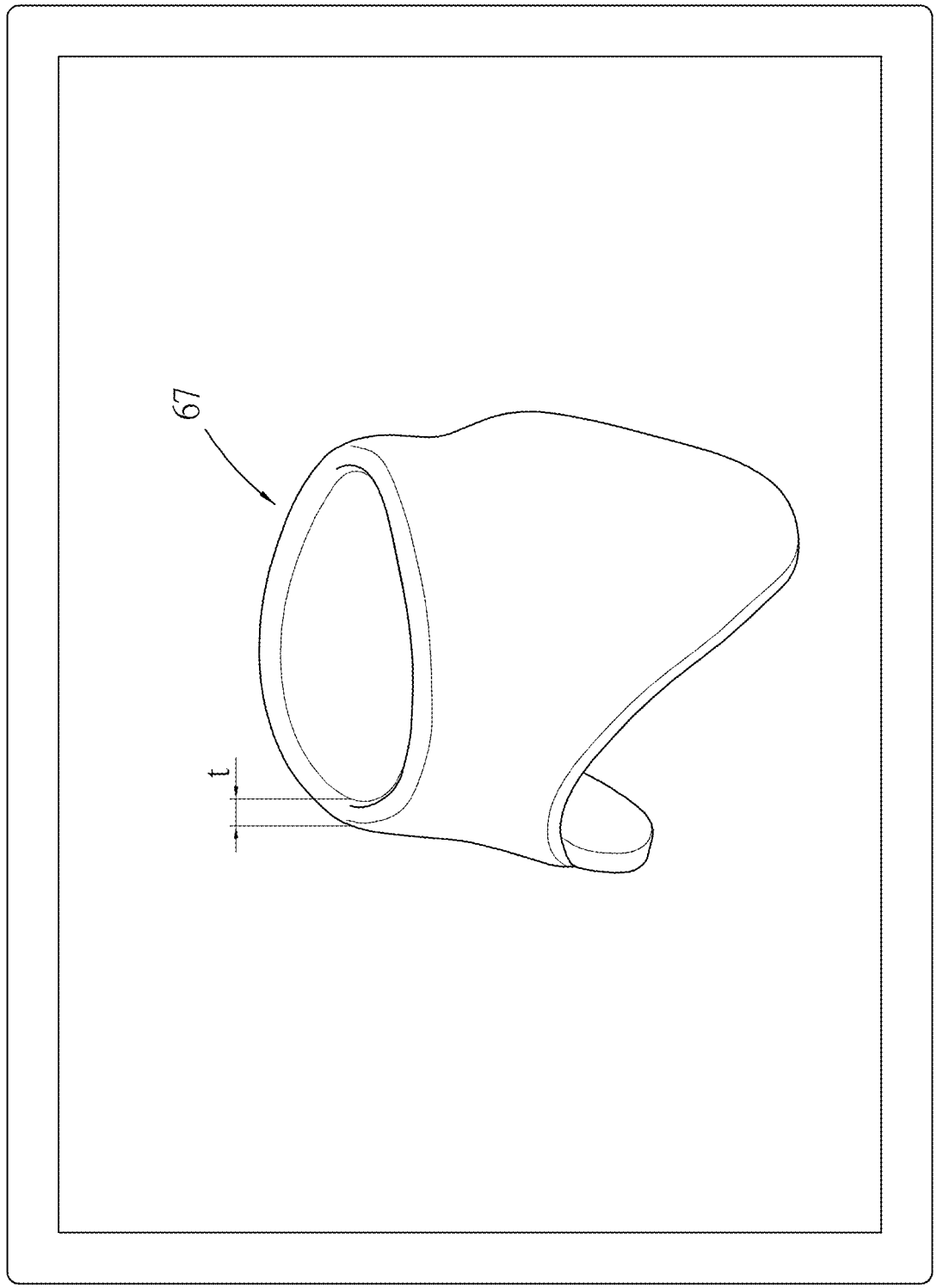
FIG. 10 is a schematic view of the tubular model thus formed.

Referring to FIGS. 9 and 10, in step S6, the processing device 12 forms, from the sub-model 66, a tubular model 67 by removing all that corresponds to the crown part 61 (see FIG. 7) (all that is over and above the boundary curve 63 in a coronal direction), and by hollowing out the sub-model 66 such that the tubular model 67 has a predetermined thickness (t) in radial directions transverse to the vertical axis. Essentially, the tubular model 67 is crown-less and hollow.

Figure 11:
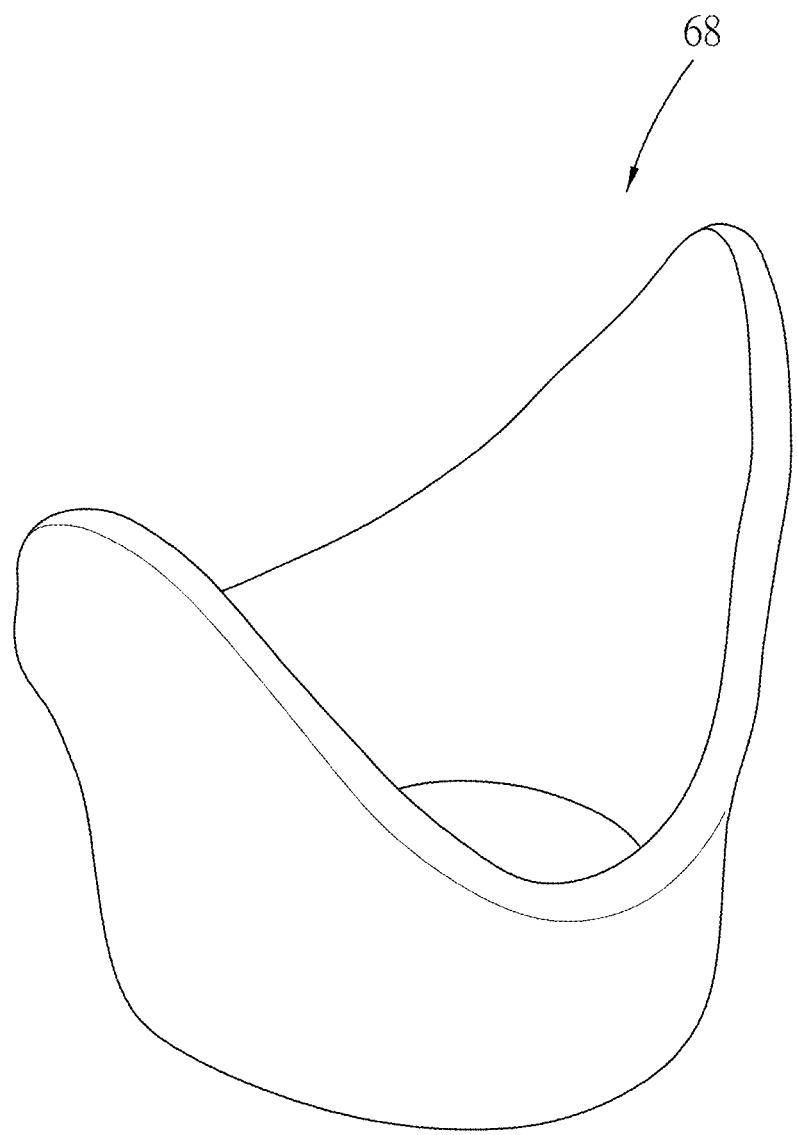
FIG. 11 is a schematic view of an adaptive element for dental implantation produced according to the tubular model.

Referring to FIG. 11, in step S7, the 3D forming equipment 13, which may be a 3D printer, a turning process machine, or a molding machine, produces the adaptive element 68 for dental implantation according to the tubular model 67. Then, the adaptive element 68 could be used in the dental implantation process.

Figure 12:
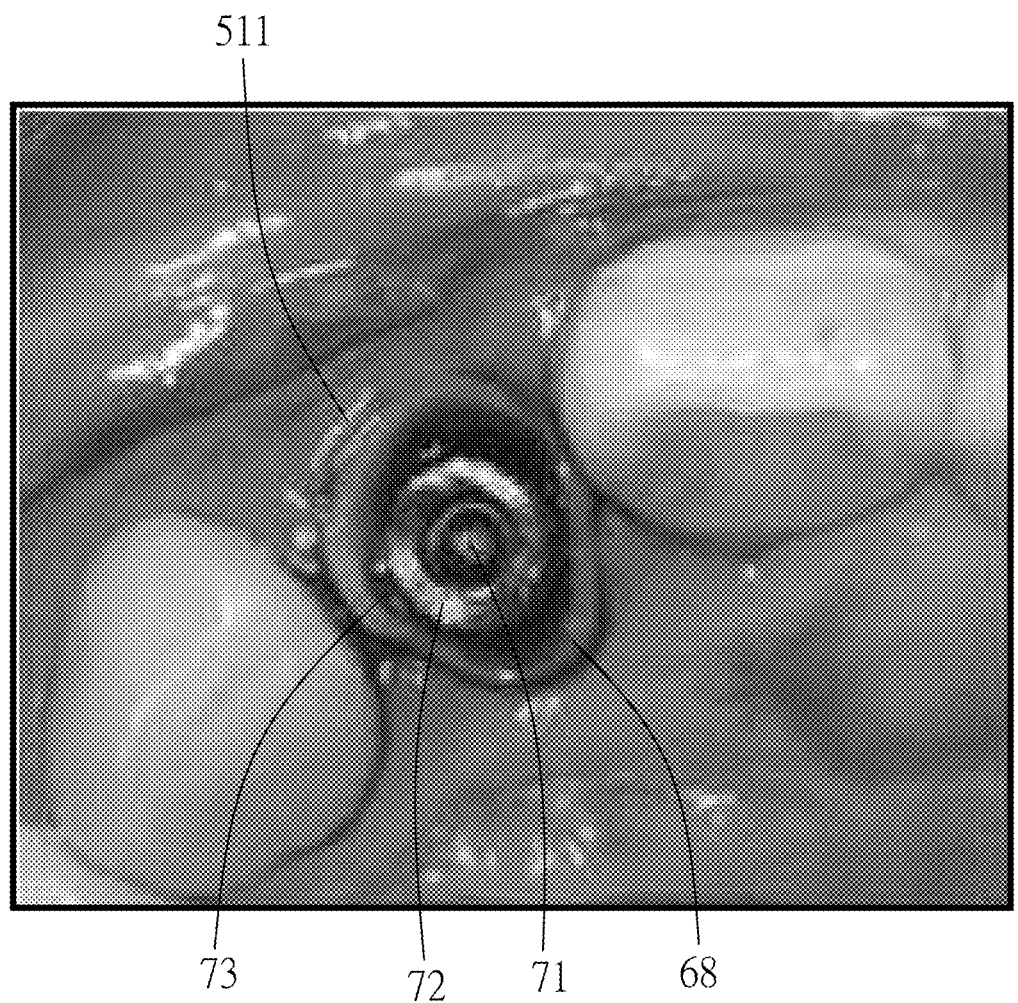
FIG. 12 is a picture showing the adaptive element applied in a dental implantation process.
Figure 13:
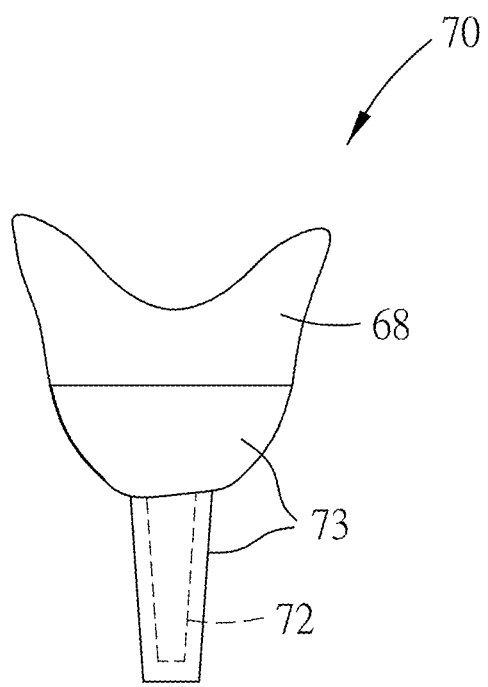
FIG. 13 is a schematic view of an integrated body composed by the adaptive element, a temporary abutment and resin.

Referring to FIGS. 12 and 13, when the to-be-treated tooth 51 has been taken out by a dentist or when the patient is missing a tooth, a dental implant 71 may be interfaced with (implanted and bonded with) the jawbone of the patient. A temporary abutment 72 is then selected by the dentist and then mounted onto the implant 71. Next, the adaptive element 68 is placed into a hole in a gum part 511 of the gums where the to-be-treated tooth 51 was originally rooted or that corresponds to an original location of the missing tooth, to surround the temporary abutment 72 and to support an inner wall of the hole. Since the adaptive element 68 is customized according to the profile of the target tooth, the adaptive element 68 will ideally be a perfect fit for the hole in the patient's gums, or will at least fit the hole better than a conventional standardized abutment. The dentist then fills up the space between the temporary abutment 72 and the adaptive element 68 with resin 73 so as to integrate the temporary abutment 72 and the adaptive element 68 to form an integrated body 70. The integrated body 70 is thus composed by the temporary abutment 72, the adaptive element 68 and the resin 73.

After the resin 73 rigidifies, the dentist dismounts the integrated body 70. Then, a dental abutment 74 may be produced based on the integrated body 70. In some embodiments, the dental abutment 74 may be made of metal or zirconia and produced by a 3D printer, a turning process machine, or a molding machine.

Figure 14:
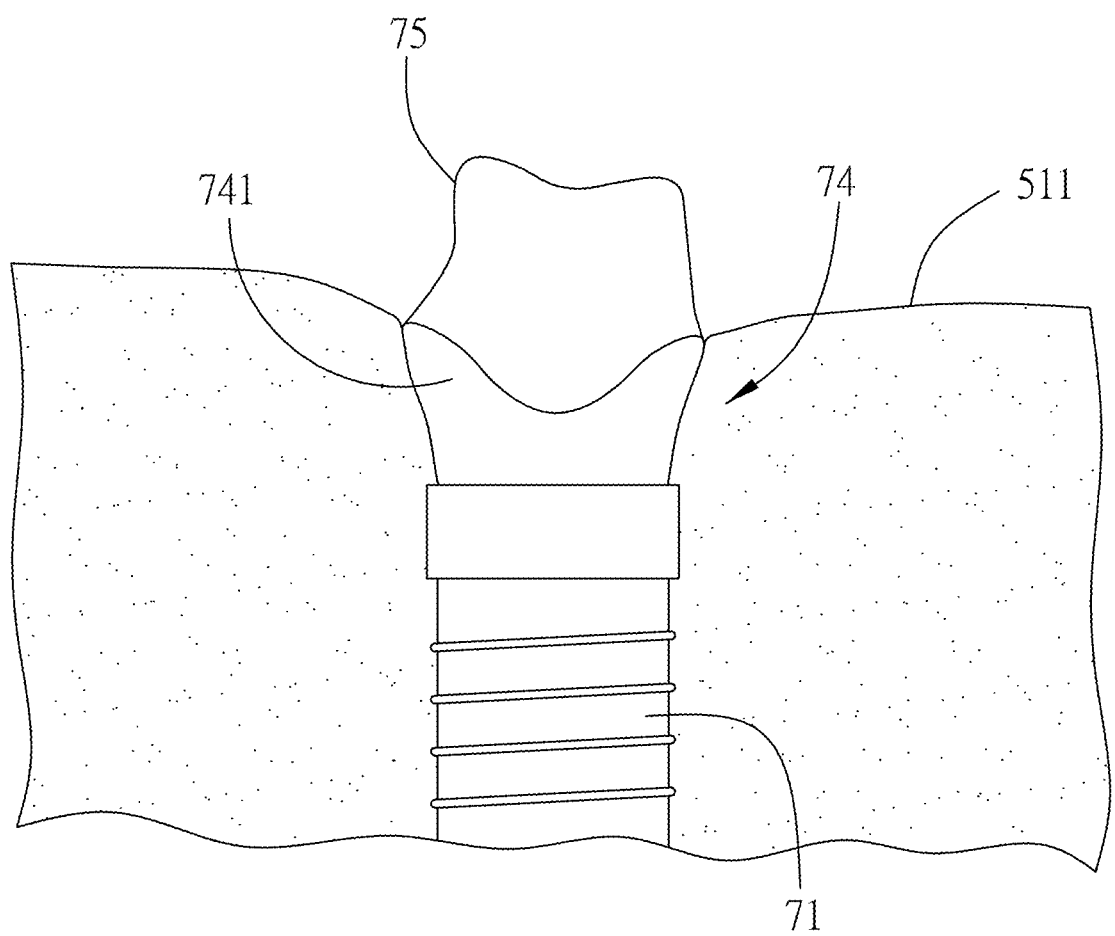
FIG. 14 is a side schematic view illustrating an dental abutment attached to an implant and securing a dental crown.

Lastly, as shown in FIG. 14, the dental abutment 74 is mounted on the implant 71, and a crown 75 is then bonded to the dental abutment 74 by cementing or screwing.

As described above, in the embodiments of the present invention, a 3D virtual model 6 is constructed based on 3D images of a to-be-treated tooth 51 or a symmetric tooth 52 of the patient, a tubular model 67 is obtained from the 3D virtual model 6, and an adaptive element 68 for dental implantation is then produced according to the tubular model 67. Thus, the adaptive element 68 may be applied during dental implantation and the dental abutment 74 may be produced accordingly. Since the part of the dental abutment 74 which is mounted to the gums is produced according to the adaptive element 68, it may fit the hole in the gum part 511 of the patient very well, or at least fit the hole better than a conventional standardized abutment.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for producing an adaptive element for dental implantation, comprising steps of:
    obtaining, by a scanning equipment, images of a target tooth of a patient;
    creating, by a processing device, a three-dimensional (3D) virtual model of the target tooth based on the images of the target tooth, the 3D virtual model of the target tooth including a crown part and a root part connected to the crown part;
    obtaining, by the processing device, a boundary curve between the crown part and the root part on the 3D virtual model of the target tooth;
    defining, by the processing device, a cutting line on the root part of the 3D virtual model of the target tooth in a manner that the cutting line is perpendicular to a vertical axis of the 3D virtual model of the target tooth and is spaced apart from the boundary curve;
    extracting, by the processing device, a sub-model from the 3D virtual model of the target tooth, with reference to the boundary curve and the cutting line;
    by the processing device, forming a tubular model from the sub-model by removing all that corresponds to the crown part and by hollowing out the sub-model such that the tubular model has a predetermined thickness in radial directions transverse to the vertical axis; and
    producing, by a 3D forming equipment, the adaptive element according to the tubular model,
    wherein the step of defining a cutting line includes:
    defining, as the cutting line, a line that is parallel to and spaced apart by a predetermined distance from a tangent line touching a reference point of the boundary curve and that is perpendicular to the vertical axis, wherein the reference point is an extremity of the boundary curve of the 3D virtual model along the vertical axis.

2. The method as claimed in claim 1, wherein the step of extracting a sub-model is to extract a segment of the 3D virtual model between a first cross section aligning with the cutting line and a second cross section spaced apart from the first cross section to serve as the sub-model in a manner that the sub-model contains an entirety of the boundary curve.

3. The method as claimed in claim 1, wherein the step of creating a 3D virtual model includes creating an initial 3D model of the target tooth based on the images of the target tooth, and creating a mirrored copy of the initial 3D model to serve as the 3D virtual model.

4. The method as claimed in claim 1, wherein the step of obtaining images of a target tooth is to obtain 3D images of the target tooth by a cone beam computed tomography (CBCT) system.

5. The method as claimed in claim 1, wherein the step of obtaining a boundary curve includes analyzing variation of curvature of a facial surface of the 3D virtual model, and obtaining the boundary curve according to the variation of the curvature.

6. The method as claimed in claim 1, wherein the step of obtaining a boundary curve includes obtaining the boundary curve based on a plurality of points that are marked on the 3D virtual model.

7. The method as claimed in claim 1, wherein the step of producing the adaptive element includes producing the adaptive element using one of a 3D printer, a turning process machine, and a molding machine.

8. A method for producing a dental abutment based on an adaptive element produced by the method of claim 1, comprising:
    interfacing a dental implant with a jawbone of the patient;
    mounting a temporary abutment on the dental implant interfaced with the jawbone of the patient;
    placing the adaptive element into a hole in gums of the patient where a to-be-treated tooth of the patient was originally embedded, to surround the temporary abutment that has been mounted on the dental implant interfaced with the jawbone of the patient,
    filling up the space between the temporary abutment and the adaptive element with resin so as to integrate the temporary abutment and the adaptive element to form an integrated body;
    dismounting the integrated body from the dental implant; and
    producing the dental abutment based on the integrated body.

* * * * *